US012589518B2

(12) United States Patent
Temme et al.

(10) Patent No.: US 12,589,518 B2
(45) Date of Patent: Mar. 31, 2026

(54) HAND-HELD PLANNING TOOL

(71) Applicant: MILWAUKEE ELECTRIC TOOL CORPORATION, Brookfield, WI (US)

(72) Inventors: Connor M. Temme, Medford, WI (US); Matthiew Schleis, West Allis, WI (US); Jeffrey S. Holly, West Bend, WI (US); Jason E. Fenner, Janesville, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 152 days.

(21) Appl. No.: 18/136,928

(22) Filed: Apr. 20, 2023

(65) Prior Publication Data

US 2023/0339136 A1 Oct. 26, 2023

Related U.S. Application Data

(60) Provisional application No. 63/334,215, filed on Apr. 25, 2022.

(51) Int. Cl.
*B27C 1/10* (2006.01)

(52) U.S. Cl.
CPC .................................... *B27C 1/10* (2013.01)

(58) Field of Classification Search
CPC ........... B27C 1/10; B27C 1/02; B23Q 16/001; B23Q 17/22; B24B 23/02; B25F 5/003; Y10T 409/306384
USPC .......... 30/475, 490, 128, 377; 409/178, 175, 409/181, 308; 144/4, 401, 402, 20; 81/475
See application file for complete search history.

(56) References Cited

U.S. PATENT DOCUMENTS

| | | | |
|---|---|---|---|
| 760,074 | A | 5/1904 | Lee |
| 851,702 | A | 4/1907 | Spietschka |
| 898,793 | A | 9/1908 | Scott |
| 1,023,406 | A | 4/1912 | Ackerman |
| 1,090,602 | A | 3/1914 | Dodds |

(Continued)

FOREIGN PATENT DOCUMENTS

| | | | |
|---|---|---|---|
| CN | 2243371 | Y | 12/1996 |
| CN | 2265879 | Y | 10/1997 |

(Continued)

OTHER PUBLICATIONS

Porter Cable, "4" Restorer Model #PXRA2676," Owner's Manual, © 2016, 18 pages.

(Continued)

*Primary Examiner* — Ghassem Alie
(74) *Attorney, Agent, or Firm* — Michael Best & Friedrich LLP

(57) ABSTRACT

A hand-held power tool includes a housing, a first shoe movably coupled to the housing, a second shoe fixedly coupled to the housing, a rotating cutting tool disposed between the first shoe and the second shoe, and a depth adjustment mechanism configured to adjust a position of the first shoe relative to the second shoe. The rotating cutting tool is configured to engage a workpiece. The depth adjustment mechanism includes a rotary handle and an inner shaft. The inner shaft is fixedly coupled to the first shoe and threadedly coupled to the rotary handle. The first shoe translates relative to the second shoe in response to rotation of the rotary handle.

8 Claims, 7 Drawing Sheets

(56) References Cited

U.S. PATENT DOCUMENTS

| | | | | |
|---|---|---|---|---|
| 1,172,828 | A | 2/1916 | Osgood et al. | |
| 1,182,745 | A | 5/1916 | Bridges | |
| 1,243,460 | A | 10/1917 | Thorn | |
| 1,270,023 | A | 6/1918 | Dyer et al. | |
| 1,272,196 | A | 7/1918 | Bloodgood | |
| 1,279,488 | A | 9/1918 | Broward | |
| 1,281,207 | A | 10/1918 | Richens | |
| 1,296,911 | A | 3/1919 | Bloodgood | |
| 1,337,350 | A | 4/1920 | Forward | |
| 1,339,172 | A | 5/1920 | Dempsey | |
| 1,346,215 | A | 7/1920 | Kraber | |
| 1,357,985 | A | 11/1920 | Impalea | |
| 1,366,389 | A | 1/1921 | Kraber | |
| 1,392,543 | A | 10/1921 | Watrous | |
| 1,396,762 | A | 11/1921 | Kraber | |
| 1,426,739 | A | 8/1922 | Hoy et al. | |
| 1,432,860 | A | 10/1922 | Hoy et al. | |
| 1,527,785 | A | 2/1925 | Carter | |
| 1,544,667 | A | 7/1925 | Loughner | |
| 1,599,713 | A | 9/1926 | Perlman | |
| 1,614,783 | A | 1/1927 | Fekete | |
| 1,641,645 | A | 9/1927 | Skolnik | |
| 1,679,562 | A * | 8/1928 | Clarke | B27C 1/10 30/475 |
| 1,706,157 | A | 3/1929 | Hannah | |
| 1,727,383 | A | 9/1929 | Simonides | |
| 1,732,594 | A | 10/1929 | Clarke | |
| 1,736,965 | A | 11/1929 | Carter | |
| 1,760,818 | A | 5/1930 | Daderko | |
| 1,775,430 | A | 9/1930 | Hibbs | |
| 1,812,755 | A | 6/1931 | Quinsler | |
| 1,900,336 | A | 3/1933 | Egan | |
| 1,929,504 | A * | 10/1933 | Macaller | B27G 17/02 30/481 |
| 1,980,056 | A | 11/1934 | Hedeby | |
| 2,030,520 | A | 2/1936 | Heimsath | |
| 2,085,603 | A | 6/1937 | Preson et al. | |
| 2,393,463 | A | 1/1946 | Gottlieb | |
| 2,395,158 | A | 2/1946 | Yandell | |
| 2,395,268 | A | 2/1946 | Goodridge | |
| 2,520,875 | A | 8/1950 | Birchmeier | |
| 2,544,098 | A | 3/1951 | Libby et al. | |
| 2,562,832 | A | 7/1951 | Strandberg | |
| 2,583,637 | A | 1/1952 | Draper | |
| 2,600,279 | A | 6/1952 | Spitzley | |
| 2,600,859 | A | 6/1952 | Drysdale | |
| 2,649,873 | A | 8/1953 | Reich et al. | |
| 2,672,172 | A | 3/1954 | Godfrey et al. | |
| 2,675,034 | A | 4/1954 | Ledding et al. | |
| 2,688,348 | A | 9/1954 | Sullivan | |
| 2,707,502 | A | 5/1955 | Anctil | |
| 2,718,248 | A | 9/1955 | Dimmer | |
| 2,719,553 | A | 10/1955 | Ballard | |
| 2,746,499 | A | 5/1956 | Greeley | |
| 2,771,104 | A | 11/1956 | Saxe | |
| 2,771,105 | A | 11/1956 | Metoff | |
| 2,774,399 | A | 12/1956 | Emmons | |
| 2,788,810 | A | 4/1957 | Jones | |
| 2,805,692 | A | 9/1957 | Thompson | |
| 2,805,696 | A | 9/1957 | Thompson | |
| 2,871,897 | A | 2/1959 | Arno et al. | |
| 2,893,454 | A | 7/1959 | Addis | |
| 2,894,549 | A | 7/1959 | Garland | |
| 2,903,030 | A | 9/1959 | Ferguson | |
| 2,984,270 | A | 5/1961 | Abberley et al. | |
| 3,126,929 | A | 3/1964 | Pedersen | |
| 3,207,195 | A | 9/1965 | Anton | |
| 3,253,624 | A | 5/1966 | Fegan et al. | |
| 3,407,857 | A | 10/1968 | Gordon | |
| 3,443,613 | A | 5/1969 | Roods | |
| 3,604,484 | A | 9/1971 | Viljoen | |
| 4,066,111 | A | 1/1978 | Klebe, Jr. | |
| 4,280,542 | A | 7/1981 | Alessio et al. | |
| 4,335,768 | A | 6/1982 | Bachmann | |
| 4,347,882 | A | 9/1982 | Bachmann | |
| 4,360,048 | A | 11/1982 | Schadlich et al. | |
| 4,363,343 | A | 12/1982 | Cuneo | |
| 4,382,729 | A | 5/1983 | Bachmann | |
| 4,433,710 | A | 2/1984 | Posta | |
| 4,442,878 | A | 4/1984 | Moriguchi et al. | |
| 4,492,260 | A | 1/1985 | Whiteford | |
| D277,451 | S | 2/1985 | Barnik | |
| 4,497,354 | A | 2/1985 | Kummer et al. | |
| 4,555,850 | A | 12/1985 | Frech | |
| 4,557,305 | A | 12/1985 | Berger et al. | |
| 4,572,259 | A | 2/1986 | Bergler | |
| 4,584,772 | A | 4/1986 | Bergler | |
| 4,597,181 | A | 7/1986 | Bergler | |
| 4,601,104 | A | 7/1986 | Zaiser et al. | |
| 4,603,479 | A | 8/1986 | Bergler | |
| 4,693,648 | A | 9/1987 | Cavedo | |
| 4,749,014 | A | 6/1988 | Schlund | |
| 4,782,871 | A | 11/1988 | Aigner | |
| 5,024,000 | A | 6/1991 | Casal | |
| 5,063,979 | A | 11/1991 | Johnson | |
| 5,066,177 | A | 11/1991 | Brown, Jr. | |
| 5,094,000 | A | 3/1992 | Becht et al. | |
| 5,140,778 | A | 8/1992 | Carruth | |
| 5,146,959 | A | 9/1992 | Terrell | |
| 5,176,478 | A | 1/1993 | Munch | |
| 5,213,457 | A | 5/1993 | Maas et al. | |
| 5,329,978 | A | 7/1994 | Hasegawa | |
| 5,343,910 | A | 9/1994 | Reines | |
| 5,363,892 | A | 11/1994 | Hild et al. | |
| 5,383,275 | A | 1/1995 | Hild et al. | |
| 5,423,642 | A | 6/1995 | Heck | |
| 5,427,483 | A | 6/1995 | Wunsch et al. | |
| 5,458,446 | A | 10/1995 | Englert et al. | |
| 5,463,816 | A | 11/1995 | Bellew et al. | |
| 5,522,684 | A | 6/1996 | Heck | |
| D375,439 | S | 11/1996 | Niwa et al. | |
| 5,765,616 | A | 6/1998 | Nishii | |
| 5,778,950 | A | 7/1998 | Wrightman | |
| D400,073 | S | 10/1998 | Hara | |
| 5,815,934 | A | 10/1998 | Eichberger et al. | |
| 5,856,715 | A | 1/1999 | Peot et al. | |
| 6,092,573 | A | 7/2000 | Zaiser | |
| 6,131,627 | A | 10/2000 | Zaiser | |
| 6,190,099 | B1 | 2/2001 | Schulz et al. | |
| 6,249,982 | B1 | 6/2001 | Zaiser | |
| 6,320,286 | B1 | 11/2001 | Ramarathnam | |
| 6,592,307 | B2 | 7/2003 | Hsieh | |
| 6,601,621 | B2 | 8/2003 | Wixey et al. | |
| 6,688,349 | B2 | 2/2004 | Roshilavati Razlan et al. | |
| 6,708,744 | B2 | 3/2004 | Wixey et al. | |
| 6,731,503 | B2 | 5/2004 | Privett et al. | |
| D497,298 | S | 10/2004 | Tillman et al. | |
| 6,886,615 | B2 | 5/2005 | Wixey et al. | |
| 6,918,419 | B2 | 7/2005 | Wixey et al. | |
| 6,920,047 | B2 | 7/2005 | Privett et al. | |
| 7,018,280 | B2 | 3/2006 | Walker | |
| 7,069,967 | B2 | 7/2006 | Park et al. | |
| 7,069,968 | B2 | 7/2006 | Thomas et al. | |
| D525,841 | S | 8/2006 | Lind et al. | |
| 7,108,028 | B2 | 9/2006 | Thomas | |
| 7,165,920 | B2 | 1/2007 | Baber | |
| 7,168,897 | B2 | 1/2007 | Baber | |
| 7,251,874 | B2 | 8/2007 | Stoeger | |
| 7,296,603 | B2 | 11/2007 | Thomas | |
| 7,299,838 | B2 | 11/2007 | Thomas | |
| 7,299,839 | B2 | 11/2007 | Thomas | |
| 7,422,040 | B2 | 9/2008 | Thomas | |
| 7,428,917 | B2 | 9/2008 | Wixey et al. | |
| 7,455,090 | B2 | 11/2008 | Thomas | |
| 7,458,402 | B2 | 12/2008 | Wixey et al. | |
| 7,497,886 | B2 | 3/2009 | Walker | |
| 7,549,450 | B2 | 6/2009 | Thomas | |
| 7,740,523 | B2 | 6/2010 | Zaiser et al. | |
| D620,775 | S | 8/2010 | Stratford et al. | |
| 7,784,506 | B2 | 8/2010 | Janzen | |
| D634,999 | S | 3/2011 | Yamamoto et al. | |
| D637,879 | S | 5/2011 | Kawase et al. | |
| 8,020,592 | B2 | 9/2011 | Nicolson | |
| 8,136,559 | B2 | 3/2012 | Rosenau et al. | |

(56) References Cited

U.S. PATENT DOCUMENTS

| | | | |
|---|---|---|---|
| 8,322,953 B2 | 12/2012 | Spitznagel | |
| 8,510,961 B2 | 8/2013 | Nicholson | |
| 9,154,009 B2 | 10/2015 | Alemu | |
| 9,281,770 B2 | 3/2016 | Wood et al. | |
| 9,318,932 B2 | 4/2016 | Purohit et al. | |
| 9,450,472 B2 | 9/2016 | Hatfield et al. | |
| 9,463,578 B2 | 10/2016 | Nicholson | |
| 9,687,995 B2 | 6/2017 | Simm | |
| 9,812,930 B2 | 11/2017 | Purohit et al. | |
| 9,819,241 B2 | 11/2017 | Smith et al. | |
| 10,056,806 B2 | 8/2018 | Hatfield et al. | |
| 10,086,529 B2 | 10/2018 | Kumakura et al. | |
| 10,128,723 B2 | 11/2018 | Mergener et al. | |
| 10,239,226 B2 | 3/2019 | Atlagic et al. | |
| 10,391,667 B2 | 8/2019 | Staeubli et al. | |
| 10,413,980 B2 | 9/2019 | Naughton et al. | |
| 10,486,291 B2 | 11/2019 | Bartoszek | |
| 10,498,195 B2 | 12/2019 | Mergener et al. | |
| 10,523,080 B2 | 12/2019 | Smith et al. | |
| 10,667,441 B2 | 5/2020 | Wohlfrom et al. | |
| 10,882,123 B2 | 1/2021 | Brewster et al. | |
| 10,923,989 B2 | 2/2021 | Hatfield et al. | |
| 10,987,823 B2 | 4/2021 | Simm | |
| 11,097,442 B2 | 8/2021 | Staeubli et al. | |
| 2004/0068875 A1 | 4/2004 | Wang | |
| 2005/0076972 A1 | 4/2005 | Wixey et al. | |
| 2005/0229409 A1* | 10/2005 | Lee | B27G 17/02 30/490 |
| 2005/0284543 A1 | 12/2005 | Kaiser | |
| 2006/0207683 A1 | 9/2006 | Park et al. | |
| 2007/0033807 A1 | 2/2007 | Wanninkhof | |
| 2007/0151114 A1 | 7/2007 | Papp et al. | |
| 2008/0003505 A1 | 1/2008 | Wuensch et al. | |
| 2009/0000696 A1 | 1/2009 | Grossman et al. | |
| 2010/0307013 A1 | 12/2010 | Refson | |
| 2011/0214302 A1 | 9/2011 | Inayoshi | |
| 2011/0214547 A1 | 9/2011 | Inayoshi | |
| 2012/0297633 A1 | 11/2012 | Atlagic | |
| 2013/0340581 A1 | 12/2013 | Delfini et al. | |
| 2013/0342041 A1 | 12/2013 | Ayers et al. | |
| 2014/0165413 A1 | 6/2014 | Goodridge | |
| 2017/0129129 A1* | 5/2017 | Simm | B27C 1/10 |
| 2017/0361488 A1 | 12/2017 | Wierzchon | |
| 2018/0034346 A1 | 2/2018 | Purohit et al. | |
| 2018/0294688 A1 | 10/2018 | Smith et al. | |
| 2018/0323681 A1 | 11/2018 | Hatfield et al. | |
| 2019/0076940 A1 | 3/2019 | Crabb et al. | |
| 2019/0091779 A1 | 3/2019 | Crabb et al. | |
| 2019/0190351 A1 | 6/2019 | Gregorich et al. | |
| 2019/0329440 A1 | 10/2019 | Staeubli et al. | |
| 2019/0337138 A1 | 11/2019 | Finnäs et al. | |
| 2020/0091793 A1 | 3/2020 | Smith et al. | |
| 2020/0112231 A1 | 4/2020 | Hatfield et al. | |
| 2020/0262037 A1 | 8/2020 | Schneider et al. | |
| 2020/0262098 A1 | 8/2020 | Chuang | |
| 2020/0368935 A1 | 11/2020 | Evatt et al. | |

FOREIGN PATENT DOCUMENTS

| | | | |
|---|---|---|---|
| CN | 2309933 | Y | 3/1999 |
| CN | 2361447 | Y | 2/2000 |
| CN | 2392655 | Y | 8/2000 |
| CN | 2437467 | Y | 7/2001 |
| CN | 2443815 | Y | 8/2001 |
| CN | 1104313 | C | 4/2003 |
| CN | 2724959 | Y | 9/2005 |
| CN | 2734442 | Y | 10/2005 |
| CN | 1978150 | A | 6/2007 |
| CN | 1978151 | A | 6/2007 |
| CN | 1986166 | A | 6/2007 |
| CN | 2933767 | Y | 8/2007 |
| CN | 201023145 | Y | 2/2008 |
| CN | 201023256 | Y | 2/2008 |
| CN | 201036842 | Y | 3/2008 |
| CN | 100396457 | C | 6/2008 |
| CN | 201067899 | Y | 6/2008 |
| CN | 201098888 | Y | 8/2008 |
| CN | 201120492 | Y | 9/2008 |
| CN | 201124498 | Y | 10/2008 |
| CN | 201214267 | Y | 4/2009 |
| CN | 201257687 | Y | 6/2009 |
| CN | 201371481 | Y | 12/2009 |
| CN | 101332599 | B | 3/2011 |
| CN | 102029630 | A | 4/2011 |
| CN | 201931508 | U | 8/2011 |
| CN | 101293328 | B | 10/2011 |
| CN | 1962212 | B | 2/2012 |
| CN | 101391317 | B | 5/2012 |
| CN | 203843808 | U | 9/2014 |
| CN | 104760031 | A | 7/2015 |
| CN | 105215950 | A | 1/2016 |
| CN | 105437161 | A | 3/2016 |
| CN | 205497714 | U | 8/2016 |
| CN | 102166766 | B | 9/2016 |
| CN | 205889417 | U | 1/2017 |
| CN | 206030095 | U | 3/2017 |
| CN | 206982903 | U | 2/2018 |
| CN | 207310109 | U | 5/2018 |
| CN | 108145795 | A | 6/2018 |
| CN | 209440364 | U | 9/2019 |
| CN | 209851151 | U | 12/2019 |
| CN | 211164426 | U | 8/2020 |
| CN | 213081747 | U | 4/2021 |
| DE | 355060 | C | 6/1922 |
| DE | 608753 | C | 1/1935 |
| DE | 817810 | C | 10/1951 |
| DE | 812209 | C | 11/1951 |
| DE | 823039 | C | 11/1951 |
| DE | 823516 | C | 12/1951 |
| DE | 844966 | C | 7/1952 |
| DE | 869264 | C | 3/1953 |
| DE | 873134 | C | 4/1953 |
| DE | 890419 | C | 9/1953 |
| DE | 890863 | C | 9/1953 |
| DE | 919197 | C | 10/1954 |
| DE | 929928 | C | 7/1955 |
| DE | 940145 | C | 3/1956 |
| DE | 1739720 | U | 2/1957 |
| DE | 1007988 | B | 5/1957 |
| DE | 1024232 | B | 2/1958 |
| DE | 1030988 | B | 5/1958 |
| DE | 971037 | C | 11/1958 |
| DE | 1790994 | U | 6/1959 |
| DE | 1080764 | B | 4/1960 |
| DE | 1860337 | U | 10/1962 |
| DE | 1870186 | U | 4/1963 |
| DE | 1943624 | U | 8/1966 |
| DE | 1946172 | U | 9/1966 |
| DE | 1977995 | U | 2/1968 |
| DE | 1980401 | U | 3/1968 |
| DE | 1986781 | U | 6/1968 |
| DE | 1994146 | U | 9/1968 |
| DE | 6923308 | U | 10/1969 |
| DE | 6923397 | U | 10/1969 |
| DE | 7013796 | U | 7/1970 |
| DE | 7021297 | U | 11/1970 |
| DE | 7021298 | U | 11/1970 |
| DE | 1957220 | A1 | 1/1971 |
| DE | 2018575 | A1 | 10/1971 |
| DE | 2141584 | A1 | 3/1973 |
| DE | 2316199 | A1 | 10/1974 |
| DE | 7131774 | U | 5/1975 |
| DE | 2445233 | A1 | 4/1976 |
| DE | 2552484 | A1 | 5/1977 |
| DE | 7701074 | U1 | 6/1977 |
| DE | 7804437 | U1 | 6/1978 |
| DE | 2743313 | A1 | 4/1979 |
| DE | 2811669 | A1 | 10/1979 |
| DE | 3109361 | A1 | 10/1982 |
| DE | 8302890 | U1 | 6/1983 |
| DE | 8323459 | U1 | 11/1983 |
| DE | 3341219 | A1 | 5/1985 |
| DE | 3341224 | A1 | 5/1985 |

(56) References Cited

FOREIGN PATENT DOCUMENTS

| | | | | |
|---|---|---|---|---|
| DE | 3341329 | A1 | 5/1985 | |
| DE | 8324322 | U1 | 5/1985 | |
| DE | 3403092 | A1 | 8/1985 | |
| DE | 8525705 | U1 | 11/1985 | |
| DE | 8527236 | U1 | 11/1985 | |
| DE | 3429177 | A1 | 2/1986 | |
| DE | 8525591 | U1 | 3/1986 | |
| DE | 3441943 | A1 | 5/1986 | |
| DE | 8602072 | U1 | 6/1986 | |
| DE | 8619361 | U1 | 9/1986 | |
| DE | 3520526 | A1 | 12/1986 | |
| DE | 8631998 | U1 | 1/1987 | |
| DE | 3531996 | A1 | 3/1987 | |
| DE | 8703839 | U1 | 4/1987 | |
| DE | 3542263 | A1 | 6/1987 | |
| DE | 3542466 | A1 | 6/1987 | |
| DE | 3600882 | A1 | 7/1987 | |
| DE | 8708512 | U1 | 8/1987 | |
| DE | 3606830 | A1 | 9/1987 | |
| DE | 8714027 | U1 | 12/1987 | |
| DE | 3621240 | A1 | 1/1988 | |
| DE | 8906895 | U1 | 7/1989 | |
| DE | 8809892 | U1 | 12/1989 | |
| DE | 4117196 | A1 | 12/1992 | |
| DE | 4212293 | A1 | 10/1993 | |
| DE | 9403695 | U1 | 5/1994 | |
| DE | 4310280 | A1 | 10/1994 | |
| DE | 4318973 | A1 | 12/1994 | |
| DE | 29519383 | U1 | 1/1996 | |
| DE | 19535248 | A1 | 4/1996 | |
| DE | 29604011 | U1 | 4/1996 | |
| DE | 29604292 | U1 | 4/1996 | |
| DE | 19535738 | A1 | 5/1996 | |
| DE | 19502977 | A1 | 8/1996 | |
| DE | 19628416 | A1 | 1/1998 | |
| DE | 29910926 | U1 | 9/1999 | |
| DE | 29812699 | U1 | 12/1999 | |
| DE | 19835724 | A1 | 2/2000 | |
| DE | 19837029 | A1 | 2/2000 | |
| DE | 29820243 | U1 | 3/2000 | |
| DE | 19853374 | A1 | 5/2000 | |
| DE | 19856278 | A1 | 6/2000 | |
| DE | 20001808 | U1 | 6/2001 | |
| DE | 20107458 | U1 | 10/2001 | |
| DE | 10035559 | A1 | 1/2002 | |
| DE | 10035560 | A1 | 1/2002 | |
| DE | 10053548 | A1 | 5/2002 | |
| DE | 10238756 | A1 | 3/2004 | |
| DE | 19713845 | B4 | 8/2005 | |
| DE | 19931118 | B4 | 11/2005 | |
| DE | 19717701 | B4 | 1/2006 | |
| DE | 19832005 | B4 | 8/2011 | |
| DE | 102010035169 | A1 | 2/2012 | |
| EP | 0003778 | A1 | 9/1979 | |
| EP | 0042445 | A1 | 12/1981 | |
| EP | 0042918 | A1 | 1/1982 | |
| EP | 0043405 | A2 | 1/1982 | |
| EP | 0044354 | A2 | 1/1982 | |
| EP | 0045730 | A2 | 2/1982 | |
| EP | 0048304 | A2 | 3/1982 | |
| EP | 0129658 | A1 | 1/1985 | |
| EP | 0133814 | A1 | 3/1985 | |
| EP | 0278019 | A1 | 8/1988 | |
| EP | 0388786 | A2 | 9/1990 | |
| EP | 0549961 | A1 | 7/1993 | |
| EP | 0618050 | A1 | 10/1994 | |
| EP | 0618051 | A1 | 10/1994 | |
| EP | 0618052 | A1 | 10/1994 | |
| EP | 0790105 | A2 | 8/1997 | |
| EP | 0861710 | A1 | 9/1998 | |
| EP | 0878280 | A2 | 11/1998 | |
| EP | 0993919 | A2 | 4/2000 | |
| EP | 1013377 | A2 | 6/2000 | |
| EP | 1013383 | A2 | 6/2000 | |
| EP | 1512506 | A1 | 3/2005 | |
| EP | 1859911 | A1 | 11/2007 | |
| EP | 1894688 | A1 | 3/2008 | |
| EP | 1897666 | A1 | 3/2008 | |
| FR | 375489 | A | 7/1907 | |
| FR | 2841490 | A1 | 1/2004 | |
| JP | 3098801 | B2 | 10/2000 | |
| KR | 200411622 | Y1 | 3/2006 | |
| WO | WO-9315885 | A1 * | 8/1993 | ............... B27C 1/10 |
| WO | WO02062541 | A1 | 8/2002 | |
| WO | WO03103902 | A1 | 12/2003 | |
| WO | WO2005053921 | A1 | 6/2005 | |
| WO | WO2006062439 | A1 | 6/2006 | |
| WO | WO2007077050 | A1 | 7/2007 | |
| WO | WO2007093821 | A1 | 8/2007 | |
| WO | WO2007099298 | A1 | 9/2007 | |
| WO | WO2008040364 | A1 | 4/2008 | |
| WO | WO2014132744 | A1 | 9/2014 | |
| WO | WO2014148947 | A1 | 9/2014 | |
| WO | WO2015064010 | A1 | 5/2015 | |
| WO | WO2019109281 | A1 | 6/2019 | |

OTHER PUBLICATIONS

Extended European Search Report for Application No. 23169078.5 dated Nov. 21, 2023 (10 pages).

* cited by examiner

HAND-HELD PLANNING TOOL

CROSS-REFERENCE TO RELATED APPLICATIONS

This application claims priority to U.S. Provisional Patent Application No. 63/334,215, filed Apr. 25, 2022, the entire content of which is incorporated herein by reference.

FIELD OF THE INVENTION

The present invention relates to power tools, and more specifically to portable hand-held power tools.

BACKGROUND OF THE INVENTION

There are various hand-held power tools known in the art for removing material from a workpiece. Some such hand-held power tools are intended to remove material from the workpiece to form a planar surface on the workpiece.

SUMMARY OF THE INVENTION

The present invention provides, in one aspect, a hand-held power tool including a housing, a first shoe movably coupled to the housing, a second shoe fixedly coupled to the housing, a rotating cutting tool disposed between the first shoe and the second shoe, and a depth adjustment mechanism configured to adjust a position of the first shoe relative to the second shoe. The rotating cutting tool is configured to engage a workpiece. The depth adjustment mechanism includes a rotary handle and an inner shaft. The inner shaft is fixedly coupled to the first shoe and threadedly coupled to the rotary handle. The first shoe translates relative to the second shoe in response to rotation of the rotary handle.

The present invention provides, in another aspect, a hand-held power tool including a housing, a front shoe movably coupled to the housing, the front shoe including a first chip ejection port and a second chip ejection port, a rear shoe fixedly coupled to the housing, a rotating cutting tool disposed between the front shoe and the rear shoe, the rotating cutting tool configured to engage a workpiece to remove material from the workpiece, and a chip direction selector disposed within the front shoe. The chip direction selector movable between a first position, in which the chip direction selector directs material removed from the workpiece toward the first chip ejection port, and a second position, in which the chip direction selector directs material removed from the workpiece toward the second chip ejection port.

The present invention provides, in yet another aspect, a hand-held power tool including a housing, a front shoe coupled to the housing at a forward end of the housing, the front shoe including a first chip ejection port and a second chip ejection port, a rear shoe coupled to the housing at an opposite, rearward end of the housing, a rotating cutting tool disposed between the front shoe and the rear shoe, the rotating cutting tool configured to engage a workpiece to remove material from the workpiece, an electric motor operably coupled to the rotating cutting tool to rotate the rotating cutting tool, and a fan operably coupled to the electric motor. The fan is configured to generate an airflow within the housing. The airflow is configured to pass over the electric motor to cool the electric motor. The airflow is configured to exit the hand-held power tool through the first chip ejection port or the second chip ejection port.

The present invention provides, in yet another aspect, a hand-held power tool including a housing, a front shoe coupled to the housing, the front shoe including a first chip ejection port and a second chip ejection port, a rear shoe coupled to the housing, a rotating cutting tool disposed between the front shoe and the rear shoe, the rotating cutting tool configured to engage a workpiece to remove material from the workpiece, and a connector removably coupled to the housing proximate the first chip ejection port or the second chip ejection port. The connector including a chip entrance configured to be in fluid communication with a vacuum or a bag, a securement protrusion engageable with a first slot in the housing, and a rotatable latch engageable with a second slot in the housing. The connector is configured to direct material removed from the workpiece from the first chip ejection port or the second chip ejection port toward the vacuum or the bag.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
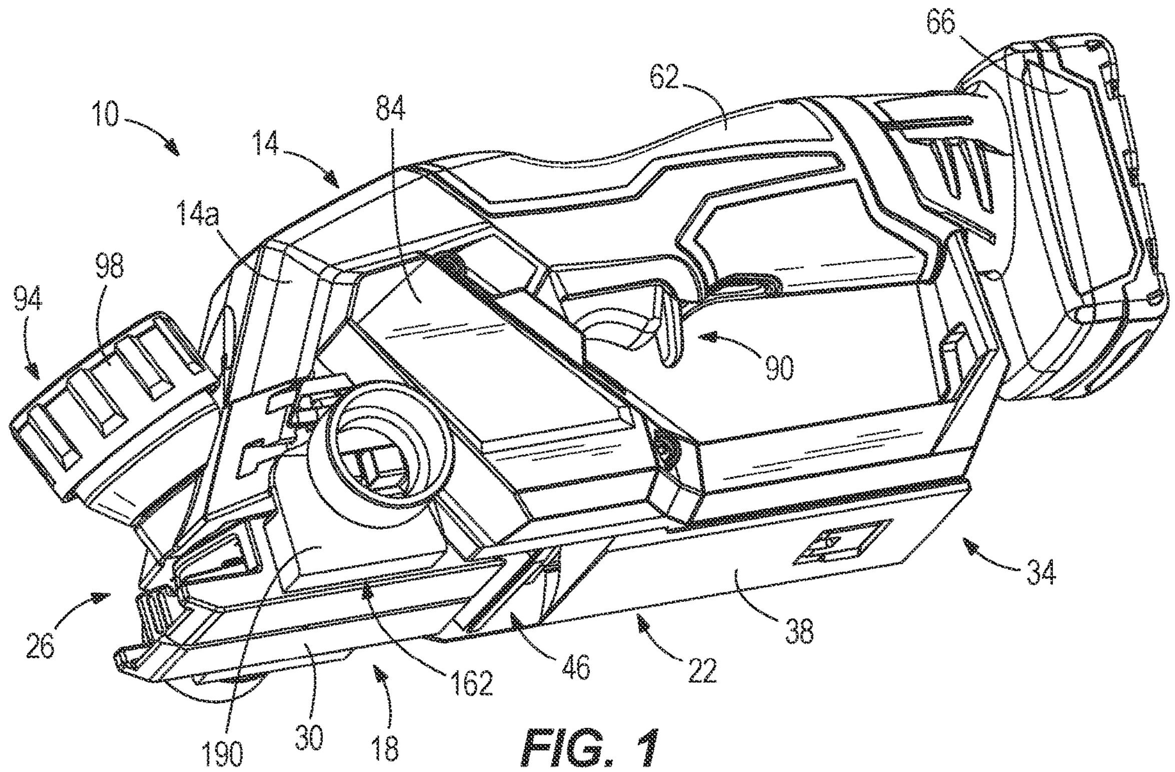
FIG. 1 is front perspective view of a hand plane in accordance with one embodiment of the present disclosure.
Figure 2:
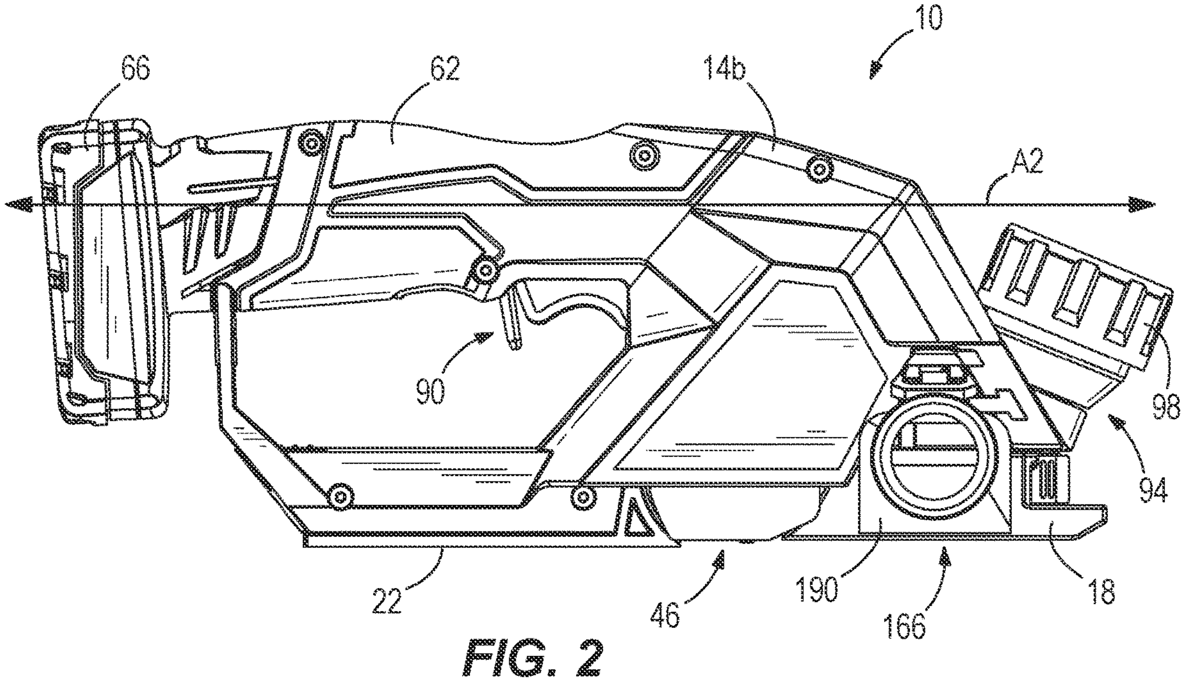
FIG. 2 is a side view of the hand plane of FIG. 1.
Figure 3:
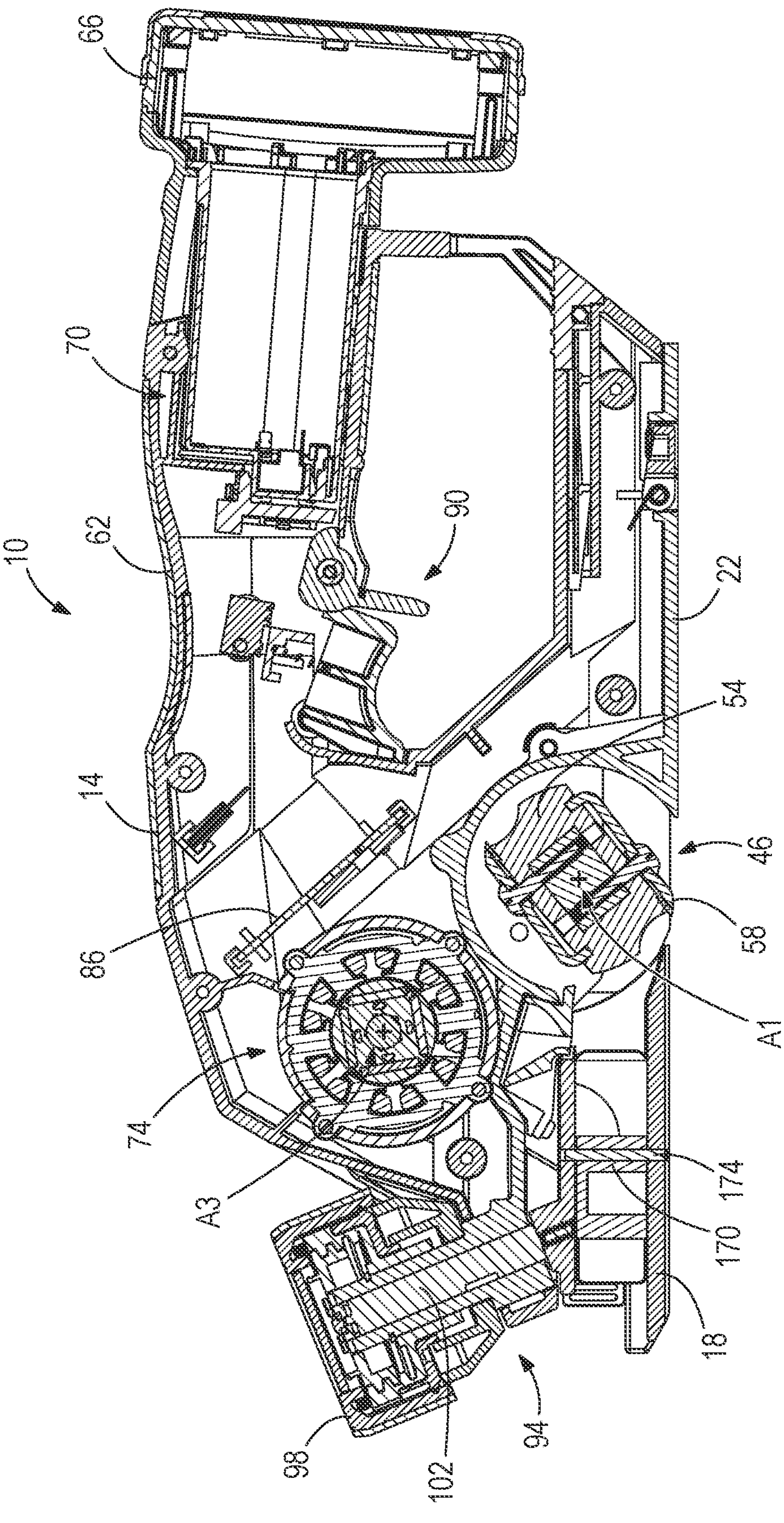
FIG. 3 is a cross-sectional view of the hand plane of FIG. 1.
Figure 4:
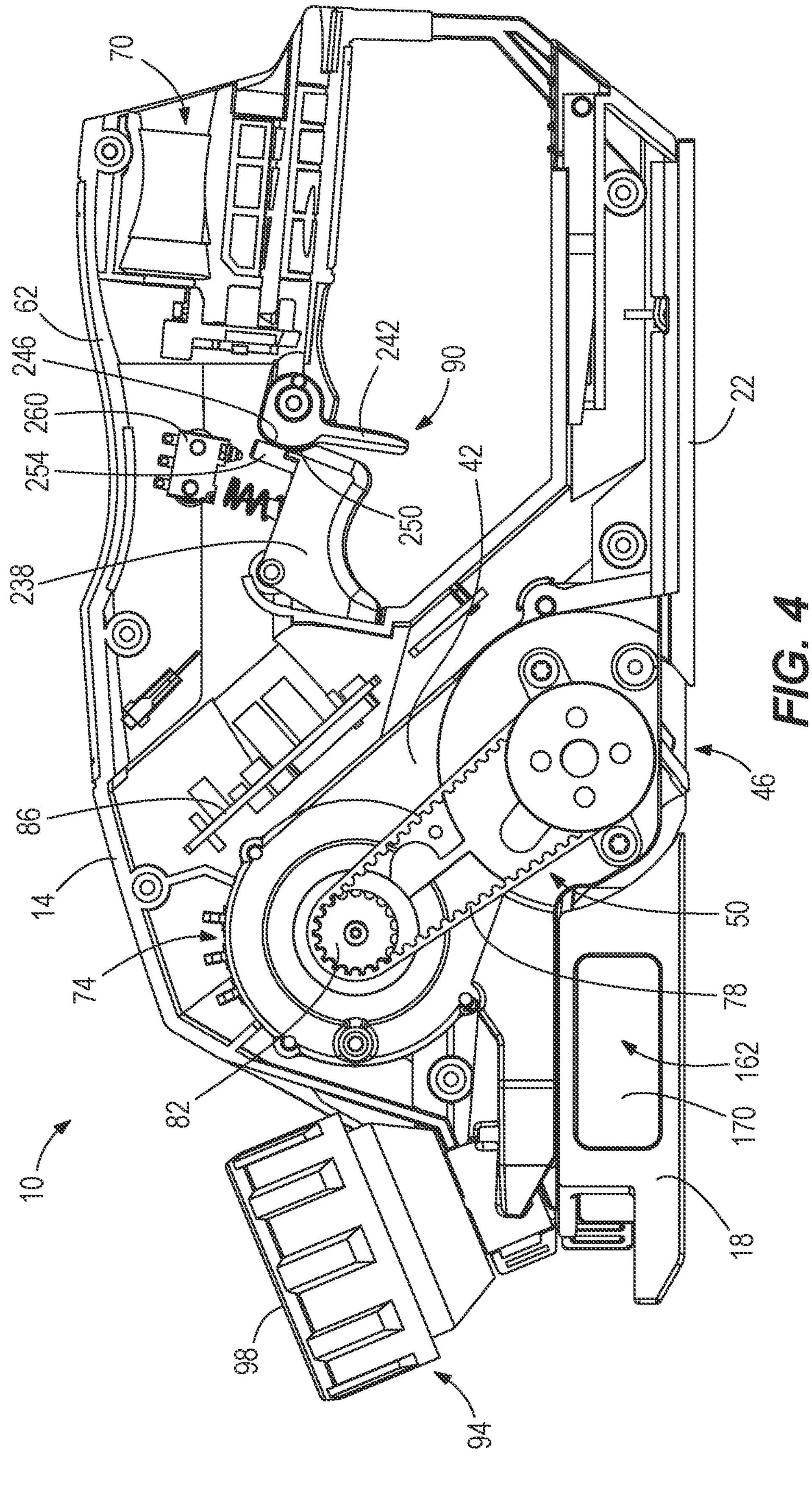
FIG. 4 is a side view of the hand plane of FIG. 1 with part of the housing hidden for clarity.

FIGS. 1-4 depict a hand-held power tool, illustrated as a cordless hand-held planning tool or hand plane 10, according to one embodiment of the present disclosure. The hand plane 10 includes a housing 14 formed of two clamshell halves (e.g., a left clamshell half 14*a* and a right clamshell half 14*b*) that ultimately support a front shoe 18 and a rear shoe 22. In particular, the front shoe 18 is movably coupled to a bottom front portion 26 of the hand plane 10 and has a planar bottom surface 30. The rear shoe 22 is coupled to a bottom rear portion 34 of the hand plane 10 and has a planar bottom surface 38. Furthermore, the rear shoe 22 extends into a central portion of the housing 14 and forms a support structure 42 for a rotating cutting tool 46 and a drivetrain 50 (FIG. 4). The rotating cutting tool 46, illustrated as a rotating drum 54 supporting at least one cutting blade 58, is disposed between the planar bottom surface 30 of the front shoe 18 and the planar bottom surface 38 of the rear shoe 22. The planar bottom surface 38 of the rear shoe 22 defines a working surface of the hand plane 10, and the rotating cutting drum 54 is positioned such that the cutting blade 58 is rotatable through a position approximately tangent to the working surface. A rotational axis A1 of the rotating cutting tool 46 is oriented transverse to a longitudinal axis A2 of the hand plane 10 (FIGS. 2 and 3). The hand plane 10 further includes a handle 62 formed by a portion of the housing 14 and extending along the longitudinal axis A2 of the hand plane 10. The handle 62 allows a user to control movement of the hand plane 10 over a workpiece. A removable battery pack 66 is coupled to the handle 62 to provide power to the cordless hand plane 10. In particular, the battery pack 66 is at least partially received within a battery receptacle 70 that extends along a length direction within the handle 62.

The drivetrain 50 includes an electric motor 74, illustrated as a brushless DC electric motor, operably coupled to the rotating cutting tool 46 to provide torque to the rotating cutting tool 46. In the illustrated embodiment, the electric motor 74 is coupled to the support structure 42 adjacent the rotating cutting tool 46. A rotational axis A3 of the electric motor 74 is parallel to the rotational axis A1 of the rotating cutting tool 46 and, when viewed along a direction parallel to the rotational axis A3 of the electric motor 74, the electric motor 74 is disposed above the rotating cutting tool 46 (e.g., further from the planar bottom surface 38 of the rear shoe 22). A transmission, illustrated as a belt drive 78, couples an output 82 of the electric motor 74 to the rotating cutting tool 46. The belt drive 78 is disposed outside the main housing 14 and covered by a transmission housing cover 84, which is removably coupled to the housing 14. In some embodiments, the transmission may be a chain drive, gear drive, or other suitable power transmission mechanism.

With continued reference to FIG. 4, the electric motor 74 is operably coupled to a electronic control unit 86 adapted to control operation of the electric motor 74 and thus the hand plane 10. Furthermore, the electric motor 74 is operably coupled to the battery pack 66 to receive power therefrom when the battery pack 66 is received within the battery receptacle 70. In response to actuation of a trigger mechanism 90, the electronic control unit 86 provides power from the battery pack 66 to the electric motor 74 to activate the electric motor 74 (e.g., initiate rotation of the motor).

In operation, the hand plane 10 is used to transform a non-planar workpiece (not shown) in a planar workpiece (not shown). To use the hand plane 10, an operator places the hand plane 10 on the workpiece such that the planar bottom surface 30 of the front shoe 18 is resting on the non-planar workpiece. An adjustable vertical offset (e.g., perpendicular to the planar bottom surface 30 of the rear shoe 22) between the planar bottom surface 30 of the front shoe 18 and the planar bottom surface 38 of the rear shoe 22 defines a cutting depth of the rotating cutting tool 46. In other words, the offset dictates an amount of the rotating cutting tool 46 that is exposed to the workpiece. Actuation of the trigger mechanism 90 by the operator begins rotation of the rotating cutting tool 46. As the operator moves the hand plane 10 in a forward direction, the rotating cutting tool 46 engages the workpiece to cut or chip material from the workpiece. The cutting or chipping of the workpiece creates a planar surface on the workpiece that is approximately co-planar with the working surface defined by the planar bottom surface 38 of the rear shoe 22.

Figure 5B:
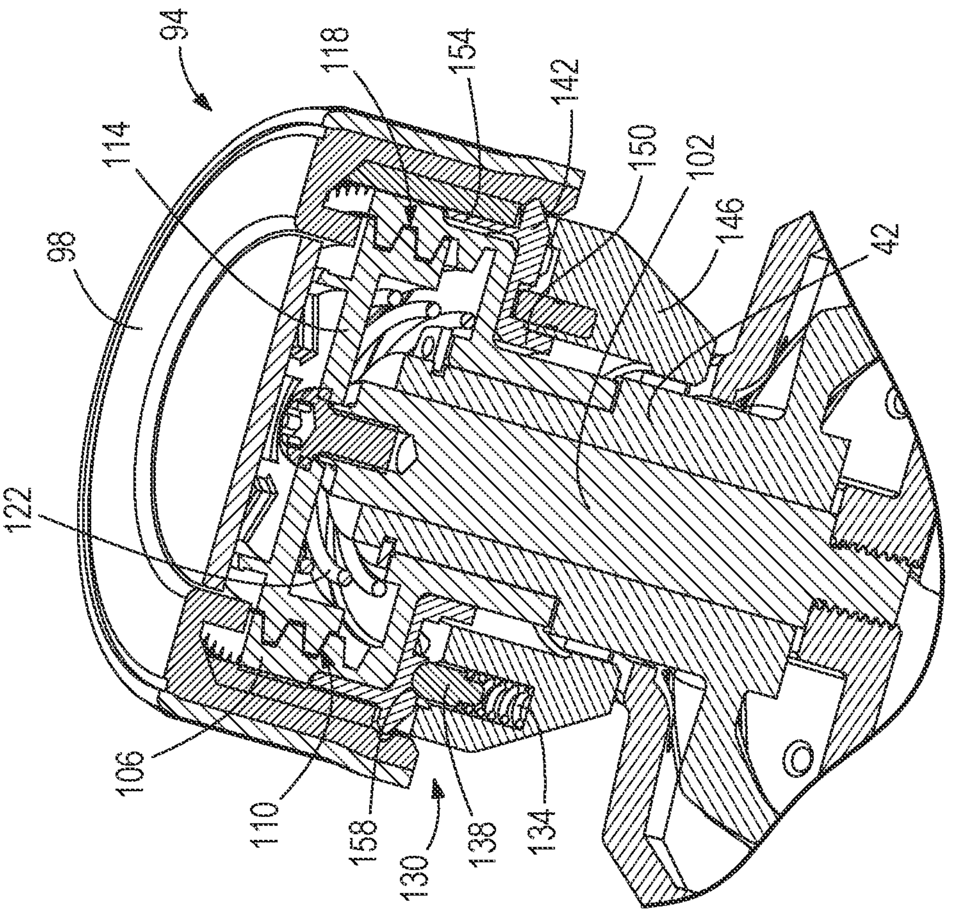
FIG. 5B is another detail view of the depth adjustment mechanism of the hand plane of FIG. 1.
Figure 5A:
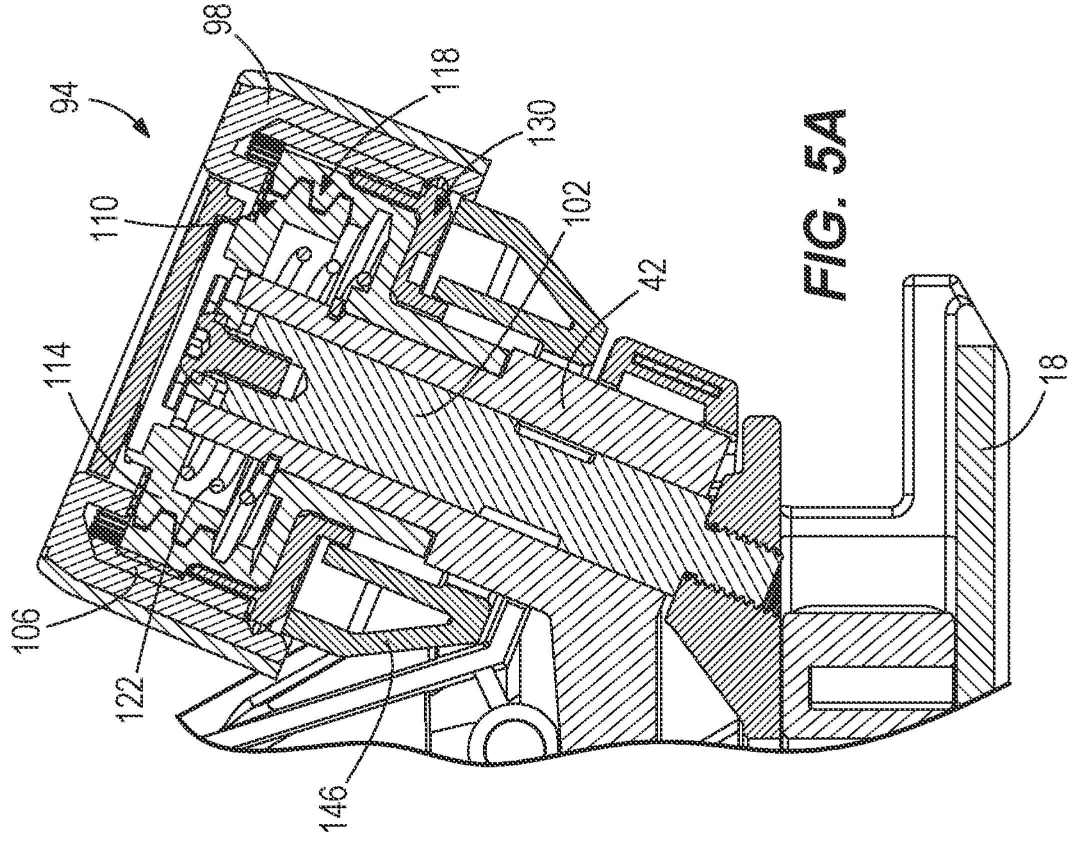
FIG. 5A is a detail view of the depth adjustment mechanism of the hand plane of FIG. 1.
Figure 6:
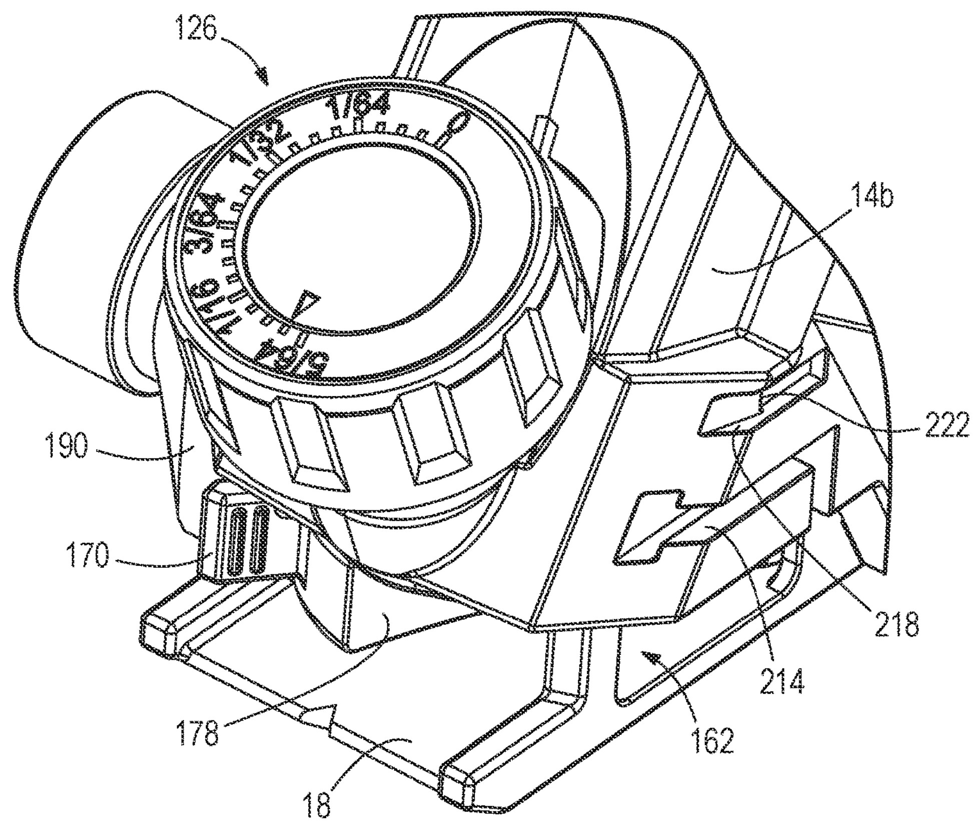
FIG. 6 is a close-up front perspective view of the hand plane of FIG. 1.

With reference to FIGS. 5A, 5B, and 6, a depth adjustment mechanism 94 allows the operator to adjust the cutting depth (i.e., the vertical offset between the front shoe 18 and the rear shoe 22). The depth adjustment mechanism 94 movably couples the front shoe 18 to the support structure 42 of the rear shoe 22 to alter the cutting depth. In other words, the depth adjustment mechanism 94 adjusts the height of the front shoe 18 relative to the rear shoe 22. A larger height difference between the front and rear shoes 18, 22 results in a greater amount of the rotating cutting tool 46 being exposed to the workpiece and, therefore, results in a deeper cutting depth into the workpiece.

The depth adjustment mechanism 94 includes a rotary handle 98 engageable by the operator to move the front shoe 18 relative to the rear shoe 22. The front shoe 18 is coupled to the rotary handle 98 by an inner shaft 102 that extends through the support structure 42 of the rear shoe 22. In some embodiments, the inner shaft 102 is integrally formed with the front shoe 18. In other embodiments the inner shaft 102 is separately formed from the front shoe 18 and fixedly coupled to the front shoe 18. For example, FIG. 5A illustrates an inner shaft 102 that is separately formed from the front shoe 18 and threadedly coupled to the front shoe 18. An outer adjustment housing 106 is disposed radially within the rotary handle 98 and rotationally fixed to the rotary handle 98 via a spline connection. Therefore, rotation of the rotary handle 98 imparts equivalent rotation on the outer adjustment housing 106. The outer adjustment housing 106 is fixed in translation relative to the support portion 42. In other words, the outer adjustment housing 106 is capable of rotational motion only. A radially inner surface 110 of the outer adjustment housing 106 is threaded. Disposed radially within the outer adjustment housing 106 is an inner adjustment housing 114. An outer surface 118 of the inner adjustment housing 114 is threaded and engaged with the threaded inner surface 110 of the outer adjustment housing 106. In the illustrated embodiment, a biasing member 122, such as a compression spring, is engaged with the outer adjustment housing 106 and the inner adjustment housing 114 to decrease backlash between the threads. In other embodiments, the biasing member 122 may be another type of spring capable of imparting a biasing force on the outer adjustment housing 106 and the inner adjustment housing 114, as will be understood by one of ordinary skill in the art. In yet other embodiments, the depth adjustment mechanism 94 may not have a biasing member 122.

The inner adjustment housing 114 is rotationally fixed to the inner shaft 102 of the front shoe 18, and the front shoe 18 is rotationally constrained relative to support structure 42. By virtue of the connection to the front shoe 18, the inner shaft 102 and the inner adjustment housing 114 are rotationally fixed. Therefore, rotation of the rotary handle 98 ultimately results in translation of the front shoe 18 along a longitudinal axis of the inner shaft 102. In the illustrated embodiment, the longitudinal axis of the inner shaft defines a rotational axis of the depth adjustment mechanism 94. More particularly, rotation of the rotary handle 98 imparts rotation to the outer adjustment housing 106, which is axially stationary with respect to the support portion 42. Due to the inner adjustment housing 114 and the inner shaft 102 being rotationally fixed but free to move in translation, rotation of the outer adjustment housing 106 relative to the inner adjustment housing 114 causes the inner shaft 102 to translate because of the threaded connection between the outer and inner adjustment housings 106, 114.

With continued reference to FIGS. 5A, 5B, and 6, the depth adjustment mechanism 94 of the illustrated embodiment includes indicia 126 to visually indicate to the operator the cutting depth. The depth adjustment mechanism 94 also includes a detent mechanism 130 to provide a tactile indication to the operator that the depth adjustment mechanism 94 has changed between discrete depth values (i.e., cutting depths). The detent mechanism 130 includes a spring 134 biasing a ball 138 towards an indicator structure 142. The detent mechanism 130 is disposed within a bottom housing 146 that is secured to the support structure 42 of the rear shoe 22. The indicator structure 142 is coupled to the rotary handle 98 for co-rotation therewith. In the illustrated embodiment, a spline fit couples the indicator structure 142 to the rotary handle 98. The spline fit allows for adjustment of the indicator structure 142 relative to the rotary handle 98 during assembly to calibrate the detent mechanism 130 (e.g., align the detent mechanism 130 with the discrete depth values and indicia 126). In the illustrated embodiment, the indicator structure 142 is a washer shaped plate having flanges 150, 154 at radially inner and outer edges. The radially outer flange 154 includes the spline fit. The indicator structure 142 includes a plurality of circumferentially spaced indentations 158, corresponding in number to the discrete depth values, which the ball 138 is biased towards (e.g., by the spring 134). Therefore, as the rotary handle 98 is rotated, the ball 138 "clicks" into the indentations 158 to indicate a change to the next discrete depth value. The depth adjustment mechanism 94 of the illustrated embodiment includes both the indicia 126 (e.g., visual indicators) and the detent mechanism 130 (e.g., tactile indicator). However, in other embodiments, the depth adjustment mechanism 94 may include one or no mechanism for indicating the cutting depth.

Figure 7:
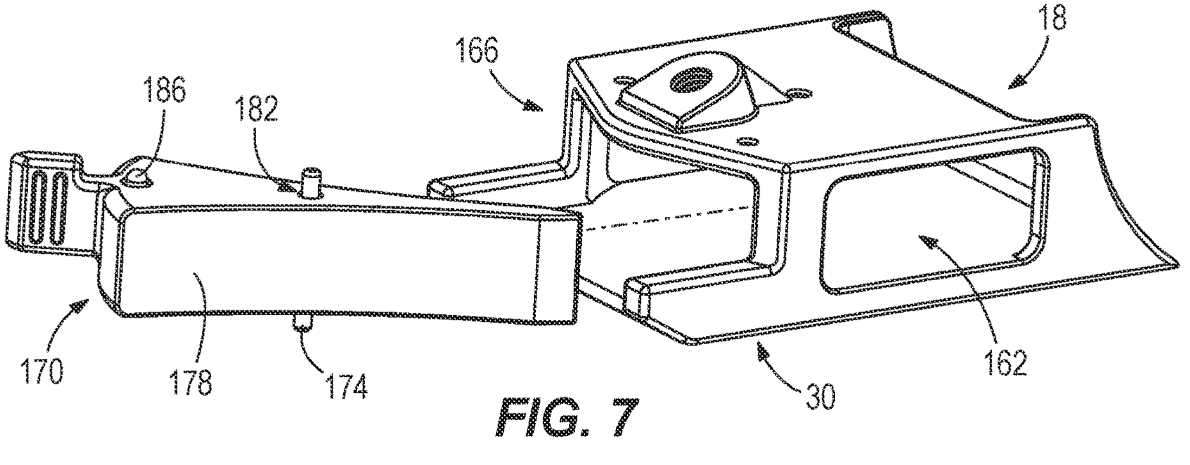
FIG. 7 is an exploded perspective view of a front shoe and a chip direction selector.

With reference to FIGS. 4, 6, and 7, the front shoe 18 includes a first chip ejection port 162 on a first side of the hand plane 10 (e.g., the side of the left clamshell half 14*a*) and a second chip ejection port 166 on a second side of the hand plane 10 (e.g., the side of the right clamshell half 14*b*), opposite the first side. The chip ejection ports 162, 166 direct material that has been removed from the workpiece by the rotating cutting tool 46 away from the rotating cutting tool 46 to ensure that the cutting blade 58 engages the workpiece without interference from previously removed material. A chip direction selector 170 is pivotably supported within the front shoe 18 to selectively block chips from being discharged through either the first chip ejection port 162 or the second chip ejection port 166.

In the illustrated embodiment, the chip direction selector 170 is fixed within the front shoe 18 (i.e., the selector 170 is non-removable from the front shoe 18). In particular, the chip direction selector 170 is pivotably coupled to the front shoe 18 via a pivot pin 174. The pivot pin 174 is vertically oriented (i.e., perpendicular to the planar bottom surface 30) within the front shoe 18. An actuator portion of the chip direction selector 170 extends beyond the front shoe 18 in a forward direction of the hand plane 10 to allow the operator to pivot the selector 170. With reference to FIG. 7, the chip direction selector 170 has a wedge portion 178. The pivot pin 174 is located within a centrally located aperture 182 of the wedge portion 178. However, one of ordinary skill in the art will understand that the location of the aperture 182 and the size and shape of the wedge portion 178 can change based on the shape of the front shoe 18, the location of the chip ejection ports 162, 166, and other design criteria. In the illustrated embodiment, the chip direction selector 170 includes a securement mechanism 186 to selectively rotationally secure the chip direction selector 170. For example, the securement mechanism 186 may be configured as a spring and ball detent engageable with indentations on the front shoe 18. The securement mechanism 186 prevents the chip direction selector 170 from inadvertent pivoting movement due to impacts from chips during operation. In other embodiments, the securement mechanism 186 may be a protrusion extending from the wedge portion 178 that engages the indentations with an interference fit, rather than a spring and ball detent.

Figure 8:
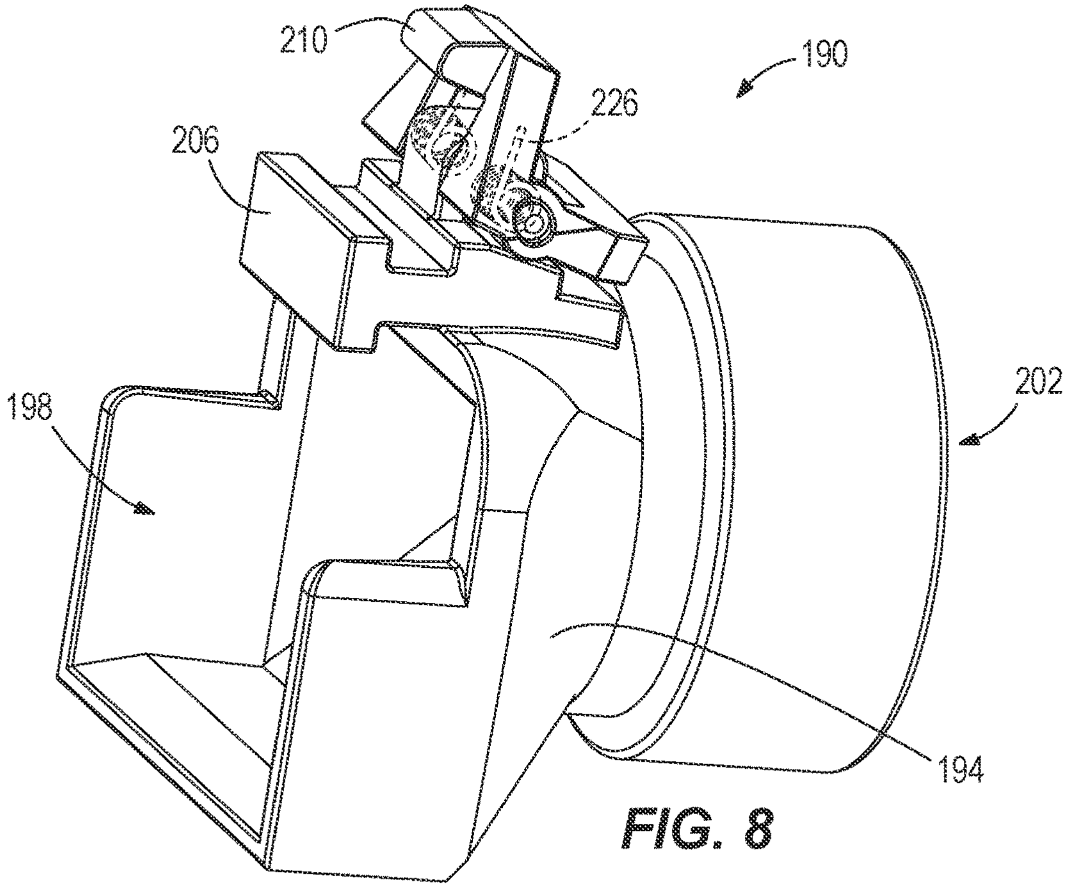
FIG. 8 is a detail view of a vacuum or bag connector.
Figure 9:
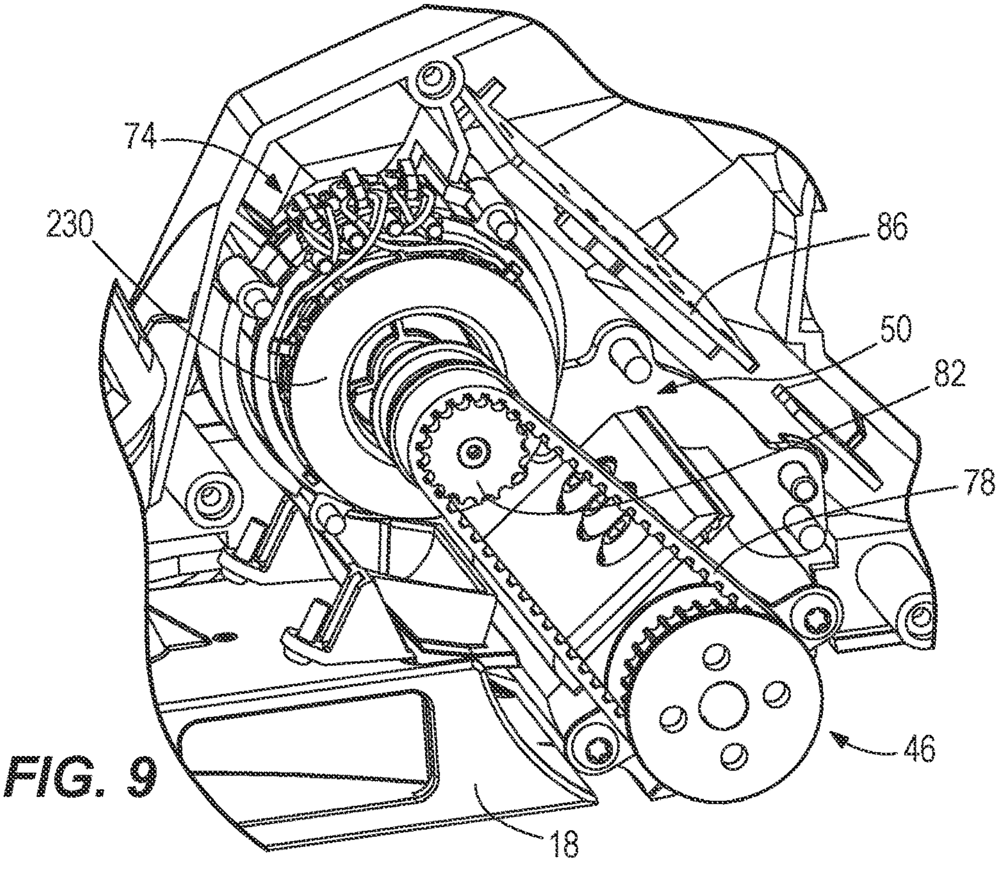
FIG. 9 is a perspective view of a drivetrain of the hand plane of FIG. 1.
Figure 10A:
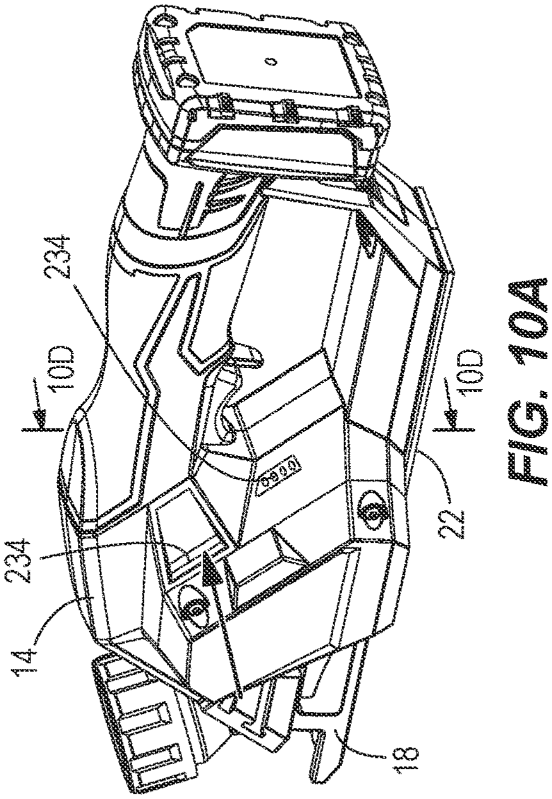
FIGS. 10A-10D illustrate an airflow pathway through the hand plane of FIG. 1.
Figure 10B:
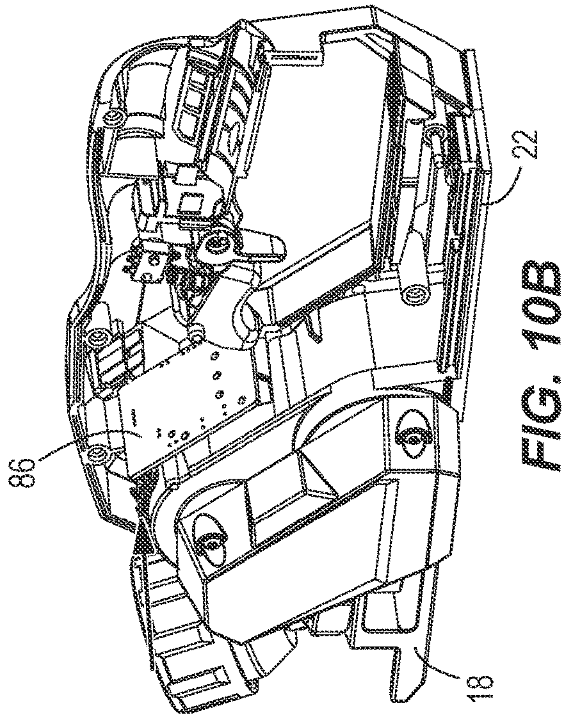
Figure 10C:
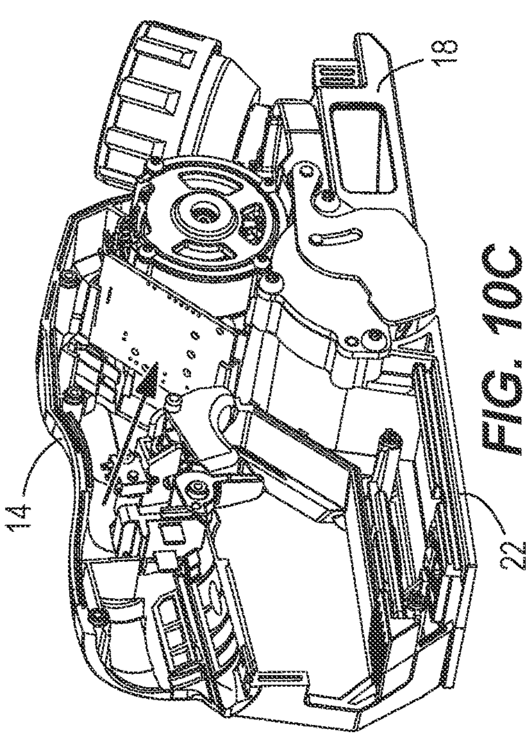
Figure 10D:
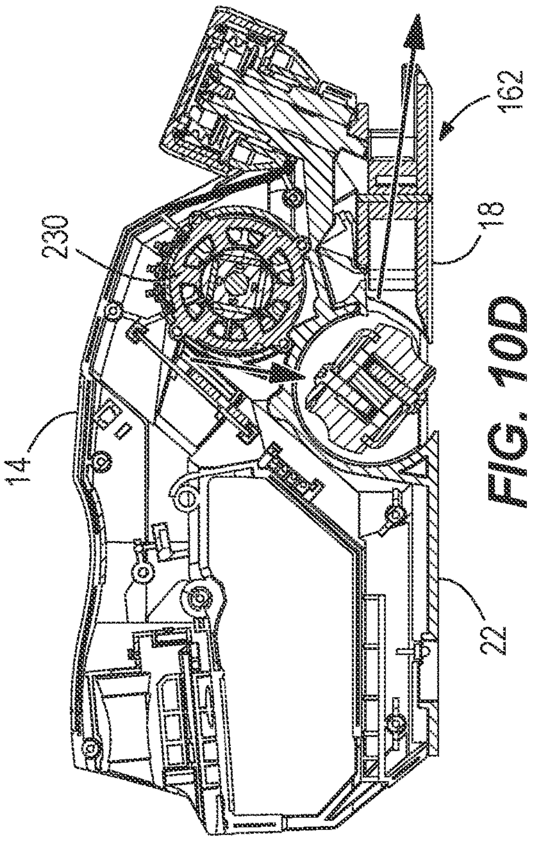

With reference to FIGS. 6 and 8, the illustrated hand plane 10 includes a vacuum or bag connector 190 to selectively couple a vacuum or a bag (not shown) to either the first chip ejection port 162 or the second chip ejection port 166. The connector 190 is securable to either ejection port 162, 166 and, therefore, will only be described in relation to the first ejection port 162. It should be understood that the following description is equally applicable to the second ejection port 166. The connector 190 allows an operator to secure a vacuum or a bag to the ejection port 162 through which the chips are directed by the chip direction selector 170. The vacuum or the bag collects the chips as they exit the ejection port 162, ensuring a clean workspace. With reference to FIG. 8, the connector 190 includes a housing 194 having a chip entrance 198 that corresponds to the ejection port 162 and a chip exit 202 to which the vacuum or the bag is securable.

The housing 194 further includes a stationary securement protrusion 206 disposed adjacent the chip entrance 198 and a rotatable securement latch 210 disposed above the securement protrusion 206. The securement protrusion 206 is shaped to fit within a first slot 214 in the housing 14 of the hand plane 10 (FIG. 6). In the illustrated embodiment, the securement protrusion 206 and the first slot 214 are T-shaped in cross-section. The latch 210 is shaped to fit within a second slot 218 in the housing 14 of the hand plane 10, thereby securing the connector 190 to the hand plane 10. In the illustrated embodiment, the second slot 218 includes a wall 222 (e.g., depth change) that prevents the latch 210 from moving toward the forward portion of the hand plane 10. The latch 210 is rotatable relative to the housing 194 of the connector 190 and biased by a torsion spring 226 towards a latched position. To install the connector 190 on the hand plane 10, the operator moves the connector 190 along the housing 14, in a direction from the front towards the rear, with the protrusion 206 aligned with the first slot 214 and the latch 210 aligned with the second slot 218. As the latch 210 passes the wall 222 of the second slot 218, the torsion spring 226 will bias the latch 210 into the slot 218. The T-shape of the protrusion 206 and first slot 214 prevents movement of the connector 190 laterally away from the housing 14, while engagement of the wall 222 and the latch 210 prevents movement of the connector 190 along the length of the housing 14. To remove the connector 190, the operator rotates the latch 210 against the force of the torsion spring 226 to release the latch 210 from the wall 222 of the second slot 218. Once the latch 210 is released, the operator slides the connector 190 towards the front of the housing 14 to remove the protrusion 206 from the first slot 214.

With reference to FIGS. 9 and 10A-10D, a fan 230 is coupled to an output 82 of the electric motor 74 to generate an airflow (arrow in FIGS. 10A-10D) within the hand plane 10. The airflow is operable to cool components of the hand plane 10 and assist in the removal of chips from the front shoe 18. In the illustrated embodiment, the fan 230 draws air into the housing 14 via inlets 234 in the left clamshell half 14*a*, adjacent the transmission housing cover 84. The air is then directed over the electronic control unit 86 and the electric motor 74 to cool the electronic control unit 86 and the motor 74. After the air flows across the electronic control unit 86, the air enters the support structure 42 of the rear shoe 22 and is directed toward the rotating cutting tool 46. At this point, the air is directed around the rotating cutting tool 46 and enjoined with the chipped material to assist in directing the chipped material towards the front shoe 18 and out of the first chip ejection port 162 or the second chip ejection port 166. In the illustrated embodiment, the air flow enters the hand plane 10 through only the left clamshell half 14*a* adjacent the belt drive 78. However, in some embodiments, the airflow may enter the hand plane 10 from the other side or both sides of the housing 14.

With reference to FIGS. 1-4, the trigger mechanism 90 includes a first or "primary" trigger 238 and a second or "auxiliary" trigger 242. The auxiliary trigger 242 is disposed on the housing 14 adjacent the primary trigger 238 and includes an arcuate surface 246 that interfaces with (e.g., slides against) a corresponding arcuate surface 250 of the primary trigger 238. The primary trigger 238 includes a projection 254 that is engageable with a switch 260 coupled to the electronic control unit 86. Actuation of the switch 260 results in actuation of the electric motor 74. The primary trigger 238 and the auxiliary trigger 242 are both moveable between a first position and a second position.

In operation, a user grasps the handle 62 and pivots the auxiliary trigger 242 from the first position toward the second position. By doing so, the arcuate surface 246 of the auxiliary trigger 242 no longer inhibits movement of the primary trigger 238. At this point, the primary trigger 238 is moveable between the first position and the second position. Movement of the primary trigger 238 toward the second position depresses the switch 260 and ultimately actuates the motor 74.

Although the invention has been described in detail with reference to certain preferred embodiments, variations and modifications exist within the scope and spirit of one or more independent aspects of the invention as described.

Various features of the invention are set forth in the following claims.

What is claimed is:

1. A hand-held power tool comprising:

a housing;

a first shoe movably coupled to the housing;

a second shoe separate from the housing and fixedly coupled to the housing;

a rotating cutting tool disposed between the first shoe and the second shoe, the rotating cutting tool configured to engage a workpiece; and a depth adjustment mechanism configured to adjust a position of the first shoe relative to the second shoe, the depth adjustment mechanism including a rotary handle, and an inner shaft, the inner shaft fixedly coupled to the first shoe and threadedly coupled to the rotary handle, wherein the first shoe translates relative to the second shoe in response to rotation of the rotary handle, and wherein the second shoe extends into a central portion of the housing, and thereby forms a support structure configured to support the first shoe and the depth adjustment mechanism.

2. The hand-held power tool of claim 1, wherein rotation of the rotary handle in a first direction results in translation of the first shoe in a direction that increases a vertical offset between a bottom surface of the first shoe and a bottom surface of the second shoe, and wherein rotation of the rotary handle in a second direction, opposite the first direction, results in translation of the first shoe in a direction that decreases the vertical offset between the bottom surface of the first shoe and the bottom surface of the second shoe.

3. The hand-held power tool of claim 1, wherein the rotary handle is configured to rotate without translating, and wherein the inner shaft is configured to translate without rotating.

4. The hand-held power tool of claim 1, wherein the depth adjustment mechanism includes an outer adjustment housing disposed within the rotary handle, wherein the outer adjustment housing is rotationally fixed to the rotary handle, and wherein a radially inner surface of the outer adjustment housing is threaded.

5. The hand-held power tool of claim 4, wherein the depth adjustment mechanism further includes an inner adjustment housing disposed within the outer adjustment housing, wherein the inner adjustment housing is threadedly coupled to the outer adjustment housing and rotationally fixed to the inner shaft.

6. The hand-held power tool of claim 1, wherein the depth adjustment mechanism includes a plurality of indicia configured to visually indicate a cutting depth of the hand-held power tool to an operator.

7. The hand-held power tool of claim 1, wherein the depth adjustment mechanism includes a detent mechanism configured to provide a tactile indication to an operator that a cutting depth of the hand-held power tool has been changed.

8. The hand-held power tool of claim 1, wherein the inner shaft extends through the support structure.

* * * * *